US009071972B1

(12) United States Patent
Wang et al.

(10) Patent No.: US 9,071,972 B1
(45) Date of Patent: Jun. 30, 2015

(54) ASYNCHRONOUS TIERED ACCESS CONTROL TO A WIRELESS HOME NETWORK

(71) Applicant: Quantenna Communications, Inc., Fremont, CA (US)

(72) Inventors: Huizhao Wang, San Jose, CA (US); Ramanujam Jagannath, Cupertino, CA (US); Qiang Wang, Fremont, CA (US); Dongyue Helen Huang, Los Altos Hills, CA (US); Bo Peng, Pleasanton, CA (US); Jinsong Han, Shanghai (CN)

(73) Assignee: Quantenna Communications Inc., Fremont, CA (US)

( * ) Notice: Subject to any disclaimer, the term of this patent is extended or adjusted under 35 U.S.C. 154(b) by 0 days.

(21) Appl. No.: 14/190,053

(22) Filed: Feb. 25, 2014

Related U.S. Application Data

(60) Provisional application No. 61/769,161, filed on Feb. 25, 2013.

(51) Int. Cl.
*H04K 1/00* (2006.01)
*H04W 12/08* (2009.01)
*H04W 12/04* (2009.01)

(52) U.S. Cl.
CPC .............. *H04W 12/08* (2013.01); *H04W 12/04* (2013.01)

(58) Field of Classification Search
CPC . H04L 41/0843; H04L 63/0428; H04L 41/18; H04W 12/02; H04W 28/18
USPC ........................................................ 380/270
See application file for complete search history.

(56) References Cited

U.S. PATENT DOCUMENTS

| | | | | |
|---|---|---|---|---|
| 7,920,549 | B2 * | 4/2011 | Alt et al. ....................... | 370/352 |
| 8,184,641 | B2 * | 5/2012 | Alt et al. .................. | 370/395.54 |
| 8,662,386 | B2 * | 3/2014 | Radicella et al. ............. | 235/380 |
| 2003/0226149 | A1 * | 12/2003 | Chun et al. ..................... | 725/78 |
| 2006/0156219 | A1 * | 7/2006 | Haot et al. ................. | 715/500.1 |
| 2006/0236221 | A1 * | 10/2006 | McCausland et al. ...... | 715/500.1 |
| 2007/0089151 | A1 * | 4/2007 | Moore et al. .................. | 725/132 |
| 2007/0113184 | A1 * | 5/2007 | Haot et al. .................... | 715/723 |
| 2008/0130529 | A1 * | 6/2008 | Khandekar et al. ........... | 370/296 |
| 2008/0219638 | A1 * | 9/2008 | Haot et al. ...................... | 386/68 |
| 2008/0232272 | A1 * | 9/2008 | Gelbman et al. .............. | 370/254 |
| 2009/0024112 | A1 * | 1/2009 | Edwards et al. ........... | 604/890.1 |
| 2009/0234791 | A1 * | 9/2009 | Delmonico et al. ............ | 706/50 |
| 2009/0260004 | A1 * | 10/2009 | Datta et al. .................... | 717/175 |
| 2010/0029282 | A1 * | 2/2010 | Stamoulis et al. ............. | 455/436 |
| 2010/0211005 | A1 * | 8/2010 | Edwards et al. ............... | 604/82 |
| 2012/0084404 | A1 * | 4/2012 | Haot et al. .................... | 709/219 |

* cited by examiner

*Primary Examiner* — Haresh N Patel
(74) *Attorney, Agent, or Firm* — IP Creators; Charles C Cary

(57) ABSTRACT

An asynchronous access controller comprising a subscriber profiler, a piracy detector and a password injector. The subscriber profiler configured to aggregate both information about subscribers together with information about each associated WLAN. The piracy detector is configured to detect whether wireless communications usage of at least one of the WLANs exceeds at least one parameter specified in a service level agreement (SLA) with the associated subscriber. The password injector controller is configured to inject a new network access password into one or more of the nodes of the WLAN responsive to an affirmative determination by the piracy detector; whereby subsequent network access is selectively revoked on the WLAN in a manner which returns communications usage thereon into conformance with the SLA for the associated subscriber.

17 Claims, 5 Drawing Sheets

Asynchronous Tiered Access Control for a Home WLAN    WAP Synchronous Access Controller PRIOR ART: ISP has No Control over Home Network     FIG. 1

ASYNCHRONOUS TIERED ACCESS CONTROL TO A WIRELESS HOME NETWORK

CROSS REFERENCE TO RELATED APPLICATION

This application claims the benefit of prior filed Provisional Application No. 61/769,161 filed on Feb. 25, 2013 entitled "Method and Apparatus for Generating a Passphrase on a Wireless Local Area Network (WLAN)" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods for access control to same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel requires an association request by a station to a WAP followed by mutual cryptographic authentication by both the station and the WAP. If the nodes mutually authenticate one another then subsequent communications are encrypted using the same shared secret, a.k.a. password, used for authentication. The most recent IEEE standard for authentication and encryption of wireless communications is set forth in IEEE 802.11i standard, also known as WPA2 Preshared Key Mode (PSK). This standard, intended for homes and small offices has an enterprise counterpart identified as WPA2 Enterprise. The centerpiece of the WPA2 PSK cryptographic schema is the subscriber entry of a shared password onto each networked device. Cryptographic processes for authentication and encryption are based on this password. The security of the network is no stronger than the security the homeowner takes to protect the password.

Communications on the single communication medium are identified as "simplex" meaning, one communication stream from a single source node to one or more target nodes at one time, with all remaining nodes capable of "listening" to the subject transmission. WLAN access by authenticated nodes relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

What is needed are improved methods for security on a wireless home network.

SUMMARY OF THE INVENTION

The present invention provides a method and apparatus for managing access to wireless local area networks (WLANs) asynchronously at an Internet Service Provider (ISP), Telco or Cable Operator, and synchronously at a wireless access point (WAP) associated with each WLAN. Thus allowing the ISP for example, to control access to each WLAN to conform with an associated service level agreement (SLA).

In an embodiment of the invention an asynchronous access controller apparatus for managing wireless local area networks (WLANs) is disclosed. The asynchronous access controller apparatus comprises a subscriber profiler, a piracy detector and a password injector. The subscriber profiler is configured to aggregate both information about subscribers together with information about each associated WLAN supporting wireless communications between a wireless access point (WAP) node and associated station nodes on a selected one of a plurality of communication channels across an available spectrum. The piracy detector is configured to detect whether wireless communications usage of at least one of the WLANs exceeds at least one parameter specified in a service level agreement (SLA) with the associated subscriber. The password injector controller is configured to inject a new network access password into one or more of the nodes of the at least one of the WLANs responsive to an affirmative determination by the piracy detector; whereby subsequent network access is selectively revoked on the at least one of the WLANs in a manner which returns communications usage thereon into conformance with the SLA for the associated subscriber.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention provides a method and apparatus for tiered access management for wireless home networks. This improves security for the homeowner, and assures that the Internet Service Provider (ISP), Telco or Cable Operator can meet service level agreements (SLA) for the homeowner subscriber.

Figure 1:
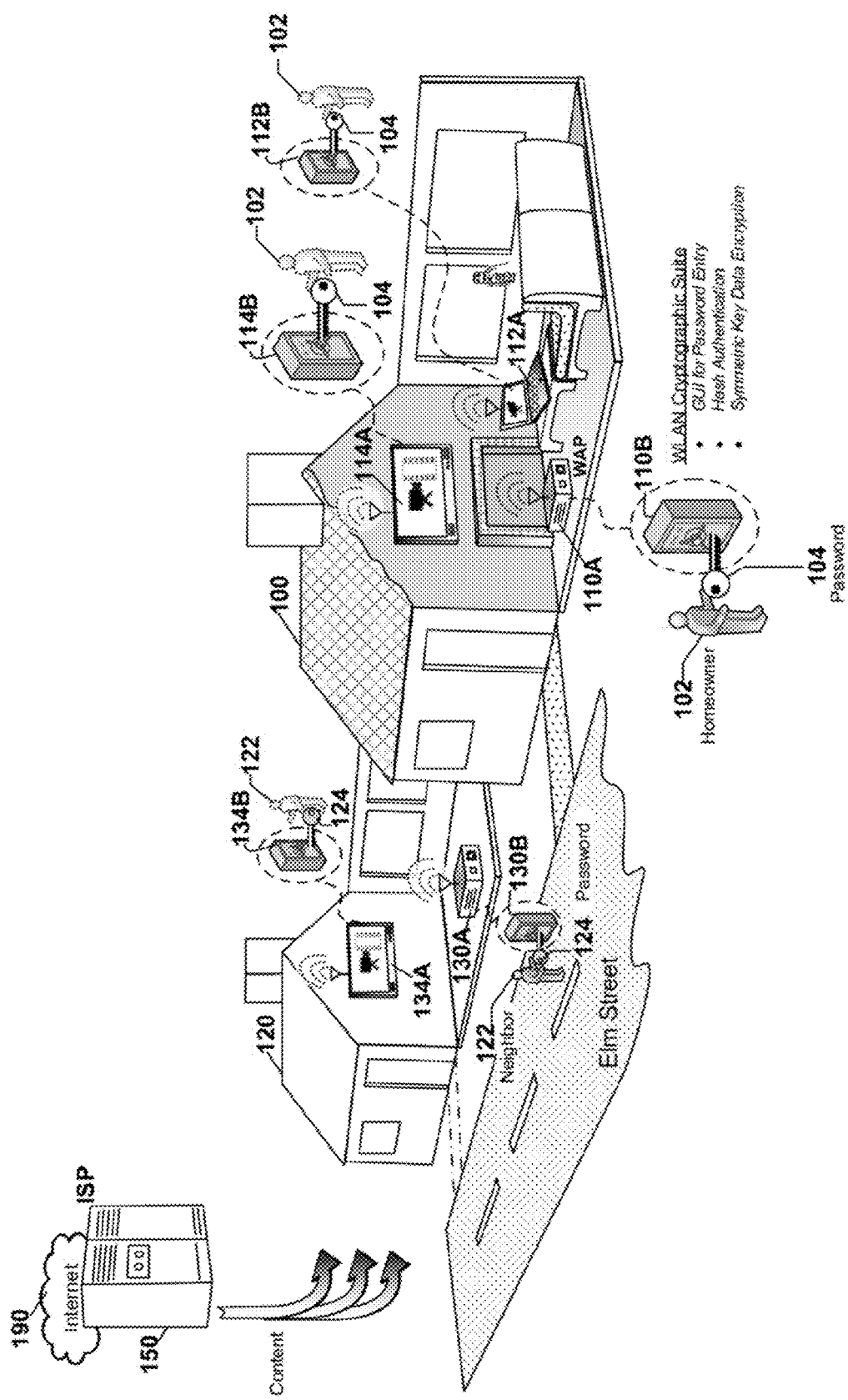
FIG. 1 is a system view of a Prior Art wireless home network implementing wireless network security controlled by each homeowners entry of a shared password into all devices on the network.

FIG. 1 is a system view of a Prior Art wireless home network implementing wireless network security controlled by each homeowners entry of a shared password into all devices on the network. In residence 100 the subscriber homeowner 102 is shown entering a common password, e.g. "ABC12345", into each wireless device. Password entry is made via a graphical user interface (GUI) and associated keyboard on each networked device or by a computer coupled to the device. The wireless local area network (WLAN) in home 100 includes: a wireless access point (WAP) node 110A, a notebook computer node 112A, and an HDTV wireless node 114A. The homeowner enters the shared password into each of these devices 110A, 112A, 114A, for use by the associated cryptographic suites thereof; 110B, 112B, 114B respectively. The wireless local area network (WLAN) in neighboring home 120 includes: a WAP node 130A, and an HDTV wireless node 134A. The neighboring homeowner subscriber 124 enters their shared password 124, e.g. "DEF12345" into each of their networked devices 130A, 134A, for use by the associated cryptographic suites thereof; 130B, 134B respectively.

Each Cryptographic suite typically implements the cryptographic approach to authentication and encryption in conformance with the IEEE 802.11i standard, also known as WPA2 Preshared Key Mode (PSK). Cryptographic Hash authentication based on the shared password and symmetric key data encryption based on a symmetric cipher also dependent on the shared password are hallmarks of this cryptographic suite.

The weak point in the entire cryptographic schema is the user generated password. The password security is typically weak because the homeowner needs to remember the password, hence it is short. Alternately the homeowner may not change the default password provided the device manufacturer which is weak because it is common to all devices sold by the manufacturer.

The ISP 150 provides access to the Internet 190 to each of the subscriber homeowners but has not role in network security, which is strictly under each homeowner's control.

Figure 2:
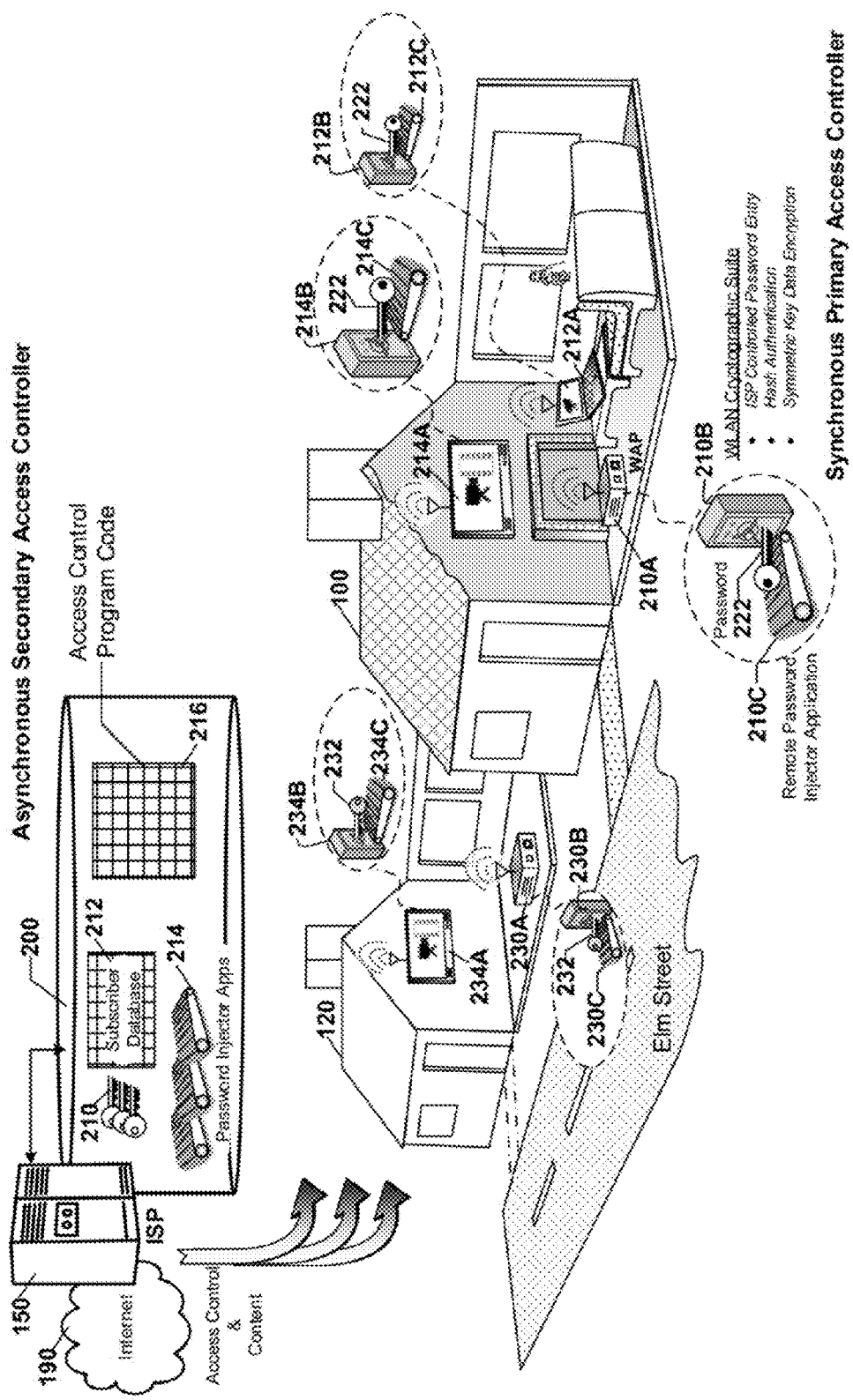
FIG. 2 is a system view of a wireless home network implementing security improvements resulting from asynchronous access control updates provided by the Internet Service Provider (ISP)

FIG. 2 is a system view of a wireless home network implementing security improvements resulting from asynchronous access control updates provided by the Internet Service Provider (ISP) 150. Remote injection of network specific passwords and updates/revocations to same is handled asynchronously by the ISP, Telco or Cable Provider, thus improving network security and removing the burdensome ongoing task of password management from the homeowner.

In residence 100 password injector applications downloaded by each device or resident in the as sold devices handles entry of shared password on each network under control of the ISP for example. The wireless local area network (WLAN) in home 100 includes: a wireless access point (WAP) node 210A, a notebook computer node 212A, and an HDTV wireless node 214A. The password injector applications 210C, 212C, 214C enter the shared password 222 into each of these devices 210A, 212A, 214A, for use by the associated cryptographic suites thereof; 210B, 212B, 214B respectively. The wireless local area network (WLAN) in neighboring home 120 includes: a WAP node 230A, and an HDTV wireless node 234A. The associated password injector applications 230C, 234C respectively enter the shared password 232 into each of their networked devices 230A, 234A, for use by the associated cryptographic suites thereof; 230B, 234B respectively.

Each Cryptographic suite implements a cryptographic approach to authentication and encryption that is compatible with the IEEE 802.11i standard, also known as WPA2 Pre-shared Key Mode (PSK). Cryptographic Hash authentication based on the shared password and symmetric key data encryption based on a symmetric cipher also dependent on the shared password are hallmarks of this cryptographic suite. In this case however the password keys are strong since they are controlled remotely by the ISP.

The security schema set forth in FIG. 2 is characterized as tiered with a first tier featuring synchronous access control provided in response to each association request by the WAP and requesting station mutually authenticating each other based on the WPA2 PSK protocol. The second security tier, features asynchronous access control by the ISP for example which controls injection and update an revocation of the shared password for each WLAN.

ISP 150 includes storage 200 for passwords 210, subscriber data 212, password injector applications 214, and program code 216 for asynchronous access control via password management, as set forth in the following FIGS. 4-5 and accompanying specification.

Throughout the remainder of this specification the phrase ISP shall be understood to be synonymous with and encompass: Service Providers of any sort including but not limited to: Internet service providers, Telco, Wireless, Satellite, and Cable Operators.

Figure 3:
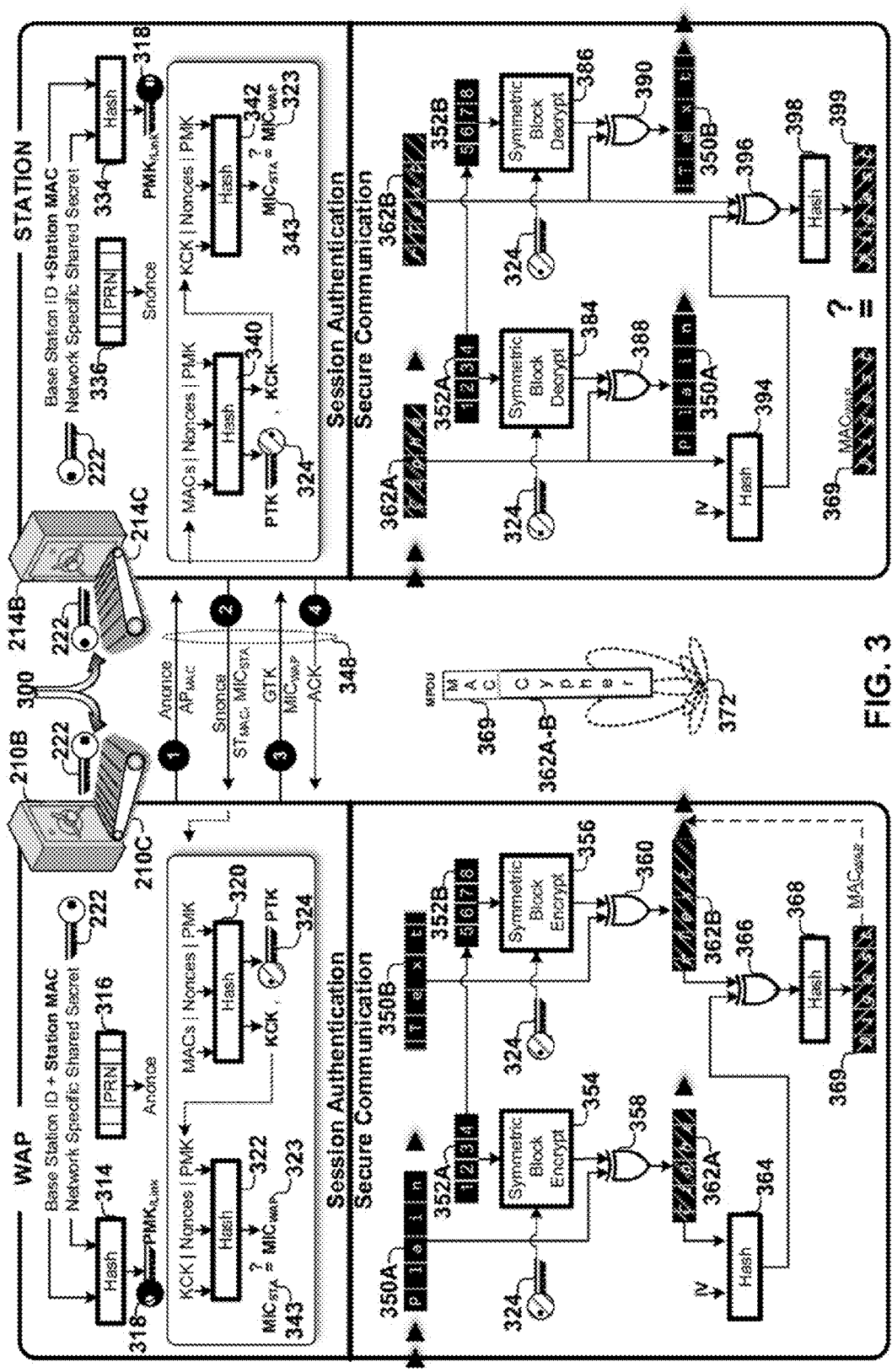
FIG. 3 is a detailed hardware block diagram of the cryptographic authentication and encryption suites on each node of each WLAN in accordance with an embodiment of the invention.

FIG. 3 is a detailed hardware block diagram of the cryptographic authentication and encryption suites on each node of each WLAN in accordance with an embodiment of the invention. The suites use various cryptographic Hash functions including as input the shared password asynchronously managed by the ISP to synchronously mutually authenticate the WAP node and the station node on each link. A cryptographic hash function takes a variable size input and returns a fixed size string, a.k.a. message digest or digest. When and if the opposing nodes are able to mutually authenticate then subsequent communications are secured using a symmetric block encryption such as Advanced Encryption Standard (AES) also using as input a temporary key derived from the shred password. The internal architecture with important exceptions conforms generally, in this embodiment of the invention to that specified in the relevant portions of the IEEE 802.11i, a.k.a. WPA2 PSK specification. The invention is equally applicable to other cryptographic suites which accept as input a shared password or secret.

Processing begins with the delivery 300 of a shared key 222 and the injection by the associated password injectors 210C and 214C of the shared key into the cryptographic suites 210B and 214B of the two devices attempting to form a wireless communication link, i.e. WAP node 210A and wireless HDTV station node 214A as shown in FIG. 2. The password injectors allow asynchronous and device specific updates of the shared password by the ISP and prevents user entry of a shared password in the fashion provided for in Prior Art implementations.

Additionally, in an embodiment of the invention the password injectors further improve network security by injecting a link specific parameter such as the media access control (MAC) address of the requesting station into the initial cryptographic hashes 314 and 318. This improves security by assuring that even if a hacker is able to attain the pairwise master key (PMK) from a specific device that PMK will be link specific, thereby preventing its use by a hacker with a different station MAC from authenticating with the WAP. In the prior art implementation of this cryptographic suite, the PMK is not generated using a link specific input and thus is vulnerable to theft and unauthorized re-use by a hacker.

Cryptographic Hash 314 accepts as input the base station ID, the link specific MAC of the requesting station, and the network specific shared secret from the ISP, i.e. password 222. The resultant digest output, a.k.a. PMK 318 is specific to the simplex link being established between the WAP and subject station. A different PMK will result from each of the other links formed by the WAP and other station nodes in the subscriber's WLAN. Additionally, a pseudo random number (PRN) is generated in PRN generator 316 the random number output of which is identified as "Anonce". At this point, the first of four mutual authentication steps identified as a "4 way handshake" 348 takes place. In step 1 of the handshake the WAP sends the PRN Anonce along with its MAC address to the cryptographic suite 214B of the station making the association request.

The cryptographic suite of the station generates its own session specific PRN generated in PRN generator 336 the random number output of which is identified as "Snonce". Additionally cryptographic Hash 334 accepts as input the base station ID, its link specific MAC, and the network specific shared secret from the ISP, i.e. password 222. The resultant digest output, a.k.a. pairwise master key (PMK) 318 is specific to the simplex link being established between the WAP and subject station. A different PMK will result from each of the other links formed by the WAP and other station nodes in the subscriber's WLAN. Then the station's cryptographic suite conducts two additional cryptographic hashes 340 and 342. The inputs to hash 340 are the MAC addresses and Nonces of both nodes on the link, i.e. the WAP and station node as well as the PMK 318. The Hash output digest has two portions identified respectively as the Pairwise transient Key (PTK) 314 and a key confirmation key (KCK). The inputs to the next hash 342 are KCK, the Nonces of both nodes and the PMK 318. The Hash output digest is identified as a message identity code (MIC). Once the station node cryptographic suite has performed these hashes, step 2 of the 4 way handshake takes place with the station sending the WAP its: Snonce, $MIC_{STA}$, and Station MAC address.

Upon receipt of the $2^{nd}$ step in the handshake the WAP's cryptographic suite 210B performs its own cryptographic hashes 320 and 322. The inputs to hash 320 are the MAC addresses and Nonces of both nodes on the link, i.e. the WAP and station node as well as the PMK 318. The Hash output digest has two portions identified respectively as the PTK 324 and a KCK. The inputs to the next hash 322 are KCK, the Nonces of both nodes and the PMK 318. The Hash output digest is identified as a MIC. The WAP is now prepared to authenticate the station by comparing the digest received from the station i.e. $MIC_{STA}$ 343, with its own digest, i.e. $MIC_{WAP}$ 323. If they MICs don't match then authentication is rejected. If they do match then, step 3 of the 4 way handshake takes place with the station sending the WAP its: $MIC_{WAP}$ 323 and an encrypted group temporal key (GTK) used to decrypt any subsequent multicast or broadcast communications between the nodes.

Upon receipt of the $3^{rd}$ step in the handshake the stations cryptographic suite compares its $MIC_{STA}$ 343 with the $MIC_{WAP}$ 323 generated by the station. If they don't match the authentication stops and the association request is rejected. If, however, the MICs match then the $4^{th}$ and final step of the 4 way authentication handshake takes place with the station sending an acknowledgement ACK of mutual authentication completion to the WAP.

Once the linked nodes have mutually authenticated control passes to cryptographically securing subsequent communications during the session between the linked nodes. FIG. 3 shows a communication from the WAP to the station, a.k.a. downlink. Secure communications in the opposite direction use identical cryptographic procedures since in this embodiment of the invention the block cipher is symmetric for encryption or decryption.

Encryption of a downlink communication commences with the parsing into blocks, e.g. blocks 350A-B, of the plaintext to be sent to the station. Also count-by-one byte counters 352A, 352B are initialized and up incremented for each successive block of plaintext. For a given set of plaintext blocks the associated counter values are encrypted in associated symmetric cipher blocks 354, 356 using for example advanced encryption standard (AES) or data encryption standard (DES) with cipher key input from the PTK 324. The encrypted counter values are then subject along with the corresponding plaintext block to a bitwise exclusive or (XOR) operation in XOR gates 358, 360 the block outputs of which are encrypted and identified as Cipher Text blocks 362A-B. This encryption architecture can be architecturally extended to include many more blocks in series. The encryption to this point is identified as counter mode cipher block chaining (CBC).

Additional cypher operations identified as message authentication code (MAC) are used to authenticate each encrypted packet. Diagramatically this is represented as a series of hash operations performed on each successive block of ciphertext and culminating in a hash digest, a.k.a. MAC which accompanies each transmitted packet. Hash 364 takes as input an initialization vector "IV" and the ciphertext block 362A. The digest output is subject to a bitwise XOR operation in XOR gate 366 with the next ciphertext block 362B. The output of XOR gate 366 is subject to another hash 368 the resultant digest 369 of which, a.k.a. $MAC_{WAP}$, is in the header of the transmitted MAC protocol data unit (MPDU) the payload of which is the blocks of ciphertext 362A-B.

At the receiving station each received cipher packet is decrypted using symmetrical cipher blocks to those used for encryption. Decryption of the downlink communication commences with the parsing into blocks, e.g. blocks 362A-B, of the ciphertext received by the station. Also count-by-one byte counters 352A, 352B are initialized and up incremented for each successive block of plaintext. For a given set of plaintext blocks the associated counter values are decrypted in associated symmetric cipher blocks 384, 386 using a symmetric cipher such as AES, or DES, with cipher key input from the PTK 324. The decrypted counter values are then subject along with the corresponding ciphertext block to a bitwise exclusive or (XOR) operation in XOR gates 388, 390 the block outputs of which are decrypted and identified as plaintext blocks 350A-B. This decryption architecture can be architecturally extended to include many more blocks in series. The decryption to this point is identified as CBC.

Additional cypher operations identified as MAC are used to authenticate each encrypted packet. Diagramatically this is represented as a series of hash operations performed on each successive block of ciphertext and culminating in a hash digest, a.k.a. MAC 399. Hash 394 takes as input an initialization vector "IV" and the ciphertext block 362A. The digest output is subject to a bitwise XOR operation in XOR gate 396 with the next ciphertext block 362B. The output of XOR gate 396 is subject to another hash 398 the resultant digest 399 of which, a.k.a. $MAC_{STA}$, is compared to the $MAC_{WAP}$ 369 received in the header of the transmitted MPDU from the WAP. If they match the received communication is authenticated.

Figure 4:
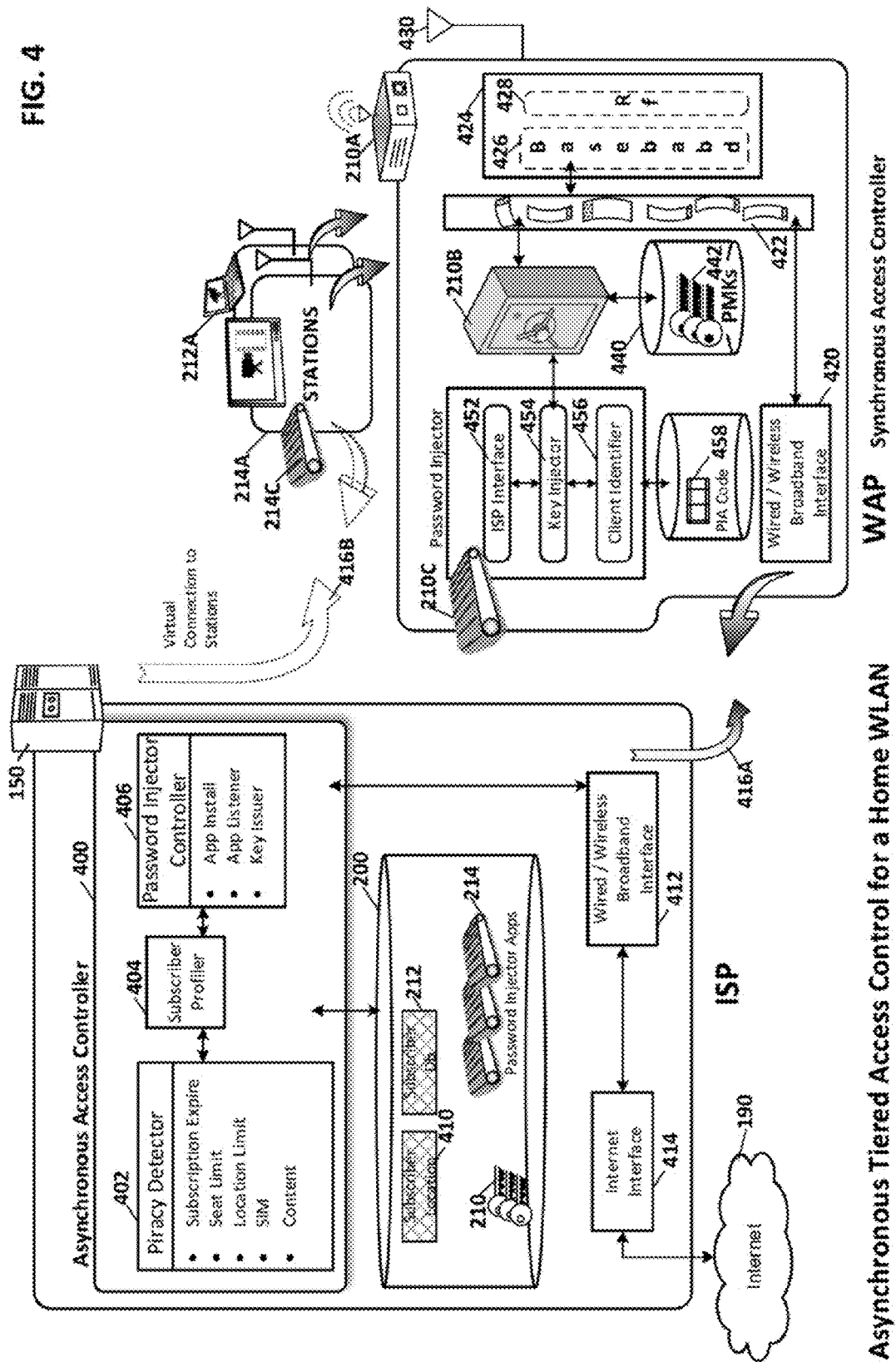
FIG. 4 is a system view of an asynchronous access controller at an ISP interfacing with a WAP operative as a synchronous access controller of an associated wireless home network in accordance with an embodiment of the invention.

FIG. 4 is a system view of an asynchronous access controller 400 at an ISP 150 interfacing with a WAP 210A operative as a synchronous access controller of an associated wireless home network in accordance with an embodiment of the invention. The WLAN nodes shown in FIG. 2, i.e. WAP 201A, and stations 212A and 214A are shown accepting asynchronous access control from the ISP and specifically the asynchronous access controller 400 thereof. The asynchronous access controller couples to multiple other WLANs (not shown) for access control of the associated devices.

WAP 210A includes a wired or wireless broadband interface 420 through which it connects with the ISP. The broadband interface in turn couples via a packet based buss 422 to the WLAN stage 424. This stage includes a base band module 426 and a radio frequency (Rf) module 428 coupled to one or more antennas 430 for wireless communication with each similarly equipped station. The stage implements one or more of the IEEE 802.11 wireless communication standards, i.e. "a", "b", "g", "n", "ac" and "ad".

The cryptographic suite 210B is shown along with its associated keystore 440 for storing the link specific PMKs 442 used to handle authentication and encryption/decryption for each associated link node. The ISP injects/updates/revokes the shared WLAN password, a.k.a. shared WLAN secret, from which the link specific PMKs 442 are generated, by means of the password injector 210C.

The password injector couples to storage 458 in which the associated password injector application program code 458 is stored. The password injector includes an ISP interface 452 for interfacing with the ISP, a key injector 454 for injecting the new shared password into the cryptographic suite 210B, and a client identifier 456. The client identifier garners client information including station usage, location, active users, content and other parameters such as subscriber information from the SIM card of an associated node and sends these to the asynchronous access controller. Each station coupled to the WAP also includes a password injector, e.g. injector 214 for HTDV station 214A.

Each station couples to the asynchronous access controller either indirectly via a relay 416A through the WAP or directly via a virtual connection 416B. In an embodiment of the invention the password injector applications poll the ISP for password updates.

The ISP includes an Internet interface 414 for coupling to the Internet 190 and a wired or wireless broadband interface 412 for coupling to each of the WLANs for regular uplink and downlink communications as well as for the asynchronous access control communications which are the subject of this invention.

The asynchronous access controller module 400 couples to storage 200 which contains: subscriber location information 410, a subscriber database 212, passwords 210, and password injector applications 214 for download and installation on each station requiring same. The subscriber database 212 contains information on the subscriber and their networked devices and users and also their associated service level agreements (SLA) with the ISP.

The asynchronous access controller includes: a piracy detector module 402, a subscriber profiler module 404 and a password injector controller 406.

The piracy detector module 402 detects whether wireless communications usage on any of the connected WLANs exceeds a metric or parameter specified in the associated SLA with the associated subscriber. Representative metrics or parameters include: a subscription expiration date, a seat limit, a user limit, a location limit, a user identify and a promised video content. In another embodiment of the invention the piracy detector uses location information provided by the subscriber profiler to detect usage outside the subscriber's premises as specified in a corresponding parameter of the corresponding SLA.

The subscriber profiler module 404 aggregates both information about subscribers together with information about each associated WLAN and nodes thereof. In an embodiment of the invention such information includes location information about each station node in the associated WLAN.

The password injector controller 406 handles password injector application download to a requesting WLAN device. Where the requesting device is an OEM device with the password injector pre-installed, no such download is required. The password injector controller initializes each subscriber's associated WLAN nodes by distributing a password injector application thereto, which application configures each node to support remote password changes or updates by the asynchronous access controller. The password injector also handles issuance and download of new/updated shared passwords to each compliant WLAN and associated nodes thereof.

The password injector controller is also responsive to a detection of piracy by the piracy detector module to download/inject a new network access password "key" into one or more of the nodes of a WLAN responsive to an affirmative determination by the piracy detector. The new shared key is distributed among the nodes of the suspect WLAN in a manner which selectively revokes access on a node by node basis in a manner which returns communications usage on the WLAN into conformance with the SLA for the associated subscriber.

The password injector controller is linked to each node on each WLAN either directly via a virtual connection through the associated WAP or indirectly via the associated WAP which participates in the controlled distribution of new passwords.

Figure 5:
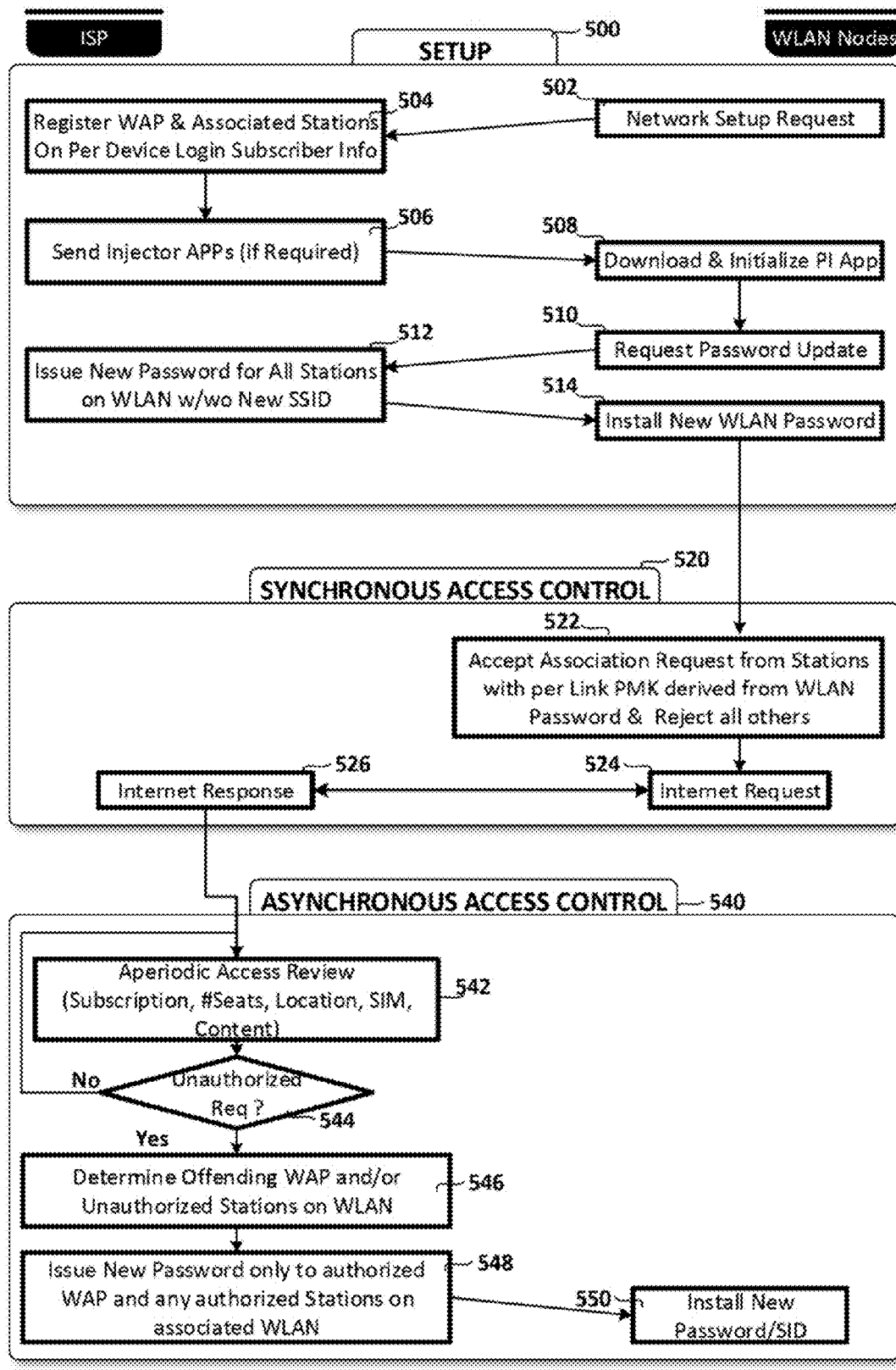
FIG. 5 is a process flow diagram of processes associated with tiered access control of a WLAN by a remote asynchronous access control device and a local synchronous access control device in accordance with an embodiment of the current invention.

FIG. 5 is a process flow diagram of processes associated with tiered access control of a WLAN by a remote asynchronous access control device and a local synchronous access control device in accordance with an embodiment of the current invention. Three process blocks are shown, specifically: setup processes 500 for enabling the WLAN and asynchronous ISP control thereof; synchronous access control processes 520 by which association requests are accepted or rejected on the WLAN and specifically between linked nodes thereof; and asynchronous access control processes 540 by which the ISP is able to intervene asynchronously to alter network access privileges to one or more nodes or to an entire network via the selective distribution of new passwords to authorized parties/nodes and the actual or implicit revocation of the password of unauthorized nodes/parties.

Setup processes 500 are shown accompanying a network setup request 502 by one or more of the nodes i.e. station nodes or WAP node(s) of a representative one of the WLANs. In an embodiment of the claimed invention this request comes during the installation by a service technician of new network devices in the subscriber's home. In another embodiment of the claimed invention this request comes from a pre-existing network in response to a new SLA or a service upgrade request. In either event, the ISP responsive to the request in process 504 registers the WAP and associated stations on the WLAN on a per device basis either automatically for OEM configured devices of manually via user interaction with a website/webpage provided by the ISP to obtain subscriber information and authorization to install the password injector application on the subject device(s). Next in process 506 the ISP sends/downloads the password injector app(s) to the requesting network WAP or station node. Nodes that have the application OEM installed do not require this step. In process 508 the password injector application is instantiated on each WLAN node. In an embodiment of the invention each node individually then requests in process 510 an updated shared password for the associated WLAN of which it is a part. In another embodiment of the invention a single request is made by the WAP one of the nodes. Next, in process 512 the ISP issues new WLAN specific passwords for all stations on each WLAN. In response to the receipt of the new WLAN password all authorized nodes on the WLAN install the same shared password in their associated cryptographic suite. Control then passes to the next set of process blocks.

In the synchronous process block 520 synchronous access control processes 520 take place by which association requests of each station node on the WLAN are accepted or rejected before simplex point to point communications can take place. In process 522 association requests are accepted or rejected from stations using a per link PMK derived from the WLAN password distributed by the ISP. Where the cryptographic derivatives of the per link PMK do not match the link with the station is rejected. Where the cryptographic derivatives of the per link PMK match control passes to processes 524 and 526 in which HTTP/HTTPS requests and responses are exchanged by the authorized one of the nodes and the ISP to deliver the requested data/video or other wireless communication.

Asynchronously control will pass to the next block of processes 540 by which the ISP is able to intervene asynchronously to alter network access privileges to one or more nodes or to an entire network via the selective distribution of new passwords to authorized parties/nodes and the actual or implicit revocation of the password of unauthorized nodes/parties.

Triggering events for such asynchronous control are shown in process 542 thereof and include but are not limited to: a subscription expiration; an increase in a number of seats/users/devices above a level specified in an associated SLA; a location associated with a WLAN node that lies outside the proscribed boundaries of the subscriber premises; a change in Subscriber Identity Module (SIM) on a suspect device; a change in requested content to content not covered in the current associated SLA. In the following decision process 544 a determination as to such "Piracy" is made. If a given node(s) is determined to require revocation of access privileges, then in the following process 546 the offending WLAN or unauthorized station nodes thereof are determined. Next in process 548 a new password is issued only to an authorized WAP and any associated authorized station nodes on the associated WLAN. No new password is issued for the offending unauthorized or non-compliant WAP or station node(s). Finally in process 550 the new password(s) are installed exclusively on the authorized devices and normal synchronous WLAN network access control resumes on the subject WLAN without the requirement for involvement by the ISP.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An asynchronous access controller apparatus for managing wireless local area networks (WLANs), the asynchronous access controller apparatus comprising:
   a subscriber profiler configured to aggregate both information about subscribers together with information about each associated WLAN supporting wireless communications between a wireless access point (WAP) node and associated station nodes on a selected one of a plurality of communication channels across an available spectrum;
   a piracy detector configured to detect whether wireless communications usage of at least one of the WLANs exceeds at least one parameter specified in a service level agreement (SLA) with the associated subscriber; and
   a password injector controller configured to inject a new network access password into one or more of the nodes of the at least one of the WLANs responsive to an affirmative determination by the piracy detector; whereby subsequent network access is selectively revoked on the at least one of the WLANs in a manner which returns communications usage thereon into conformance with the SLA for the associated subscriber.

2. The asynchronous access controller apparatus of claim 1, further comprising:
   the piracy detector further configured to detect whether wireless communications usage of at least one of the WLANs exceeds at least one of: a subscription expiration date, a seat limit, a user limit, a location limit, a user identify and a promised video content as specified in the SLA of the associated subscriber.

3. The asynchronous access controller apparatus of claim 1, further comprising:
   the password injector controller further configured to initialize each subscriber's associated WLAN nodes by distributing a password injector application thereto, which application configures each node to support remote password changes or updates by the asynchronous access controller.

4. The asynchronous access controller apparatus of claim 1, further comprising:
   the password injector controller further configured to initialize each subscriber's associated WLAN nodes by distributing a password injector application to each associated WAP node for re-distribution to associated remaining nodes, which application configures each node to support remote password changes or updates by the asynchronous access controller.

5. The asynchronous access controller apparatus of claim 1, further comprising:
   the password injector controller further configured to initialize each subscriber's associated WLAN nodes by distributing a password injector application to nodes lacking same, which application configures each node to support remote password changes or updates by the asynchronous access controller.

6. The asynchronous access controller apparatus of claim 1, further comprising:
   the password injector controller linked to each node on the at least one WLAN for controlled distribution of new passwords, responsive to periodic password update requests from each node; thereby allowing a controlled updating of the shared WLAN password to selected nodes of the WLAN.

7. The asynchronous access controller apparatus of claim 1, further comprising:
the subscriber profiler further configured to aggregate both information about the subscriber together with location information about each station node in the associated WLAN; and
the piracy detector further configured to use said location information to detect usage outside the subscriber's premises as specified in a corresponding parameter of the corresponding SLA.

8. A method for asynchronous access control of wireless local area networks (WLANs), the method comprising:
aggregating both information about subscribers together with information about each associated WLAN supporting wireless communications between a wireless access point (WAP) node and associated station nodes on a selected one of a plurality of communication channels across an available spectrum;
detecting whether wireless communications usage of at least one of the WLANs exceeds at least one parameter specified in a service level agreement (SLA) with the associated subscriber; and
injecting a new network access password into one or more of the nodes of the at least one of the WLANs responsive to an affirmative determination in the detecting act; whereby subsequent network access is selectively revoked on the at least one of the WLANs in a manner which returns communications usage thereon into conformance with the SLA for the associated subscriber.

9. The method for asynchronous access control of WLANs of claim 8, wherein the detecting act further comprises:
detecting whether wireless communications usage of at least one of the WLANs exceeds at least one of: a subscription expiration date, a seat limit, a user limit, a location limit, a user identify and a promised video content as specified in the SLA of the associated subscriber.

10. The method for asynchronous access control of WLANs of claim 8, wherein the injecting act further comprises:
distributing a password injector application to each subscriber's associated WLAN nodes, which application configures each node to support remote password changes or updates.

11. The method for asynchronous access control of WLANs of claim 8, wherein the injecting act further comprises:
distributing a password injector application to each subscriber's associated WAP node for re-distribution to associated remaining nodes, which application configures each node to support remote password changes or updates.

12. The method for asynchronous access control of WLANs of claim 8, wherein the injecting act further comprises:
distributing a password injector application to nodes lacking same, which application configures each node to support remote password changes or updates.

13. The method for asynchronous access control of WLANs of claim 8, wherein the injecting act further comprises:
selectively responding to periodic password update requests from each node on the at least one WLAN with a new password; thereby allowing a controlled updating of the shared WLAN password to selected nodes of the WLAN.

14. The method for asynchronous access control of WLANs of claim 8, wherein the aggregating and detecting acts further comprise:
aggregating both information about the subscriber together with location information about each station node in the associated WLAN; and
utilizing said location information to detect usage outside the subscriber's premises as specified in a corresponding parameter of the corresponding SLA.

15. The method for asynchronous access control of WLANs of claim 8, further comprising:
authenticating a session with an associated WLAN node by determining whether the associated WLAN node shares the same password; and
encrypting, in the event of an affirmative determination in the authenticating act, subsequent communications with the associated WLAN node based on the shared password.

16. The method for asynchronous access control of WLANs of claim 8, further comprising:
combining link specific information with the new password to generate both a link specific master key for authenticating a session between link nodes and a link specific temporary key cryptographically derived from the link specific master key for encrypting communications between the link nodes.

17. The method for asynchronous access control of WLANs of claim 12, wherein the aggregating act further comprises:
aggregating the channel utilization information at an Internet Service Provider, a Telco or a Cable Provider operative as an asynchronous access controller with respect to WAP nodes associated with each WLAN.

* * * * *